United States Patent
Cheng

(10) Patent No.: US 9,734,341 B1
(45) Date of Patent: Aug. 15, 2017

(54) SYSTEMS AND METHODS FOR PROTECTING COMPUTING SYSTEMS FROM PERIPHERAL DEVICES

(71) Applicant: Symantec Corporation, Mountain View, CA (US)

(72) Inventor: Cui Cheng, Chengdu (CN)

(73) Assignee: Symantec Corporation, Mountain View, CA (US)

( * ) Notice: Subject to any disclaimer, the term of this patent is extended or adjusted under 35 U.S.C. 154(b) by 20 days.

(21) Appl. No.: 14/256,897

(22) Filed: Apr. 18, 2014

(51) Int. Cl.
*H04L 29/06* (2006.01)
*G06F 21/60* (2013.01)

(52) U.S. Cl.
CPC .............. *G06F 21/60* (2013.01); *H04L 63/20* (2013.01); *H04L 63/08* (2013.01)

(58) Field of Classification Search
CPC ....... H04L 63/20; H04L 63/102; H04L 63/08; H04L 63/0428; H04L 63/164; G06F 21/6218; Y02E 60/12; H02J 7/0042
See application file for complete search history.

(56) References Cited

U.S. PATENT DOCUMENTS

| | | | | |
|---|---|---|---|---|
| 9,122,813 B2* | 9/2015 | Oljaca | ................. | G06F 13/4081 |
| 2005/0055471 A1* | 3/2005 | Payne | ................... | G06F 13/102 710/5 |
| 2011/0119418 A1* | 5/2011 | Barron | ................ | G06F 13/4282 710/106 |
| 2013/0080726 A1* | 3/2013 | Kegel et al. | ................... | 711/163 |
| 2013/0275779 A1* | 10/2013 | He | ............................... | 713/300 |
| 2013/0283349 A1* | 10/2013 | Liu et al. | ........................... | 726/3 |
| 2014/0317418 A1* | 10/2014 | Lin | ..................... | H04L 63/0471 713/190 |
| 2015/0002075 A1* | 1/2015 | Tuli | .............................. | 320/107 |

\* cited by examiner

*Primary Examiner* — Ali Abyaneh
*Assistant Examiner* — Shaqueal Wade
(74) *Attorney, Agent, or Firm* — FisherBroyles LLP

(57) ABSTRACT

A computer-implemented method for protecting computing systems from peripheral devices may include (1) identifying a peripheral device configured to perform a charging function and at least one non-charging function, (2) configuring an endpoint protection application with an endpoint protection rule that allows the charging function of the peripheral device and does not allow the non-charging function of the peripheral device, (3) detecting that the peripheral device is connected to a computing system that is provisioned with the endpoint protection application, and (4) applying the endpoint protection rule on the computing system to allow the charging function of the peripheral device so that the peripheral device is able to charge via the computing system and block the non-charging function of the peripheral device from being performed on the computing system. Various other methods, systems, and computer-readable media are also disclosed.

18 Claims, 7 Drawing Sheets

SYSTEMS AND METHODS FOR PROTECTING COMPUTING SYSTEMS FROM PERIPHERAL DEVICES

BACKGROUND

Computing devices face many threats from the wide variety of other computing devices to which they are connected. Malicious websites and servers on the Internet are a common problem, as are infected computing systems on a local network. But peripheral devices are also a potential vector for Trojans, viruses, spyware, and malicious software of all kinds. A key logger on a portable storage device may pose as much of a threat to a computing system as a piece of malware inadvertently downloaded off the Internet.

Despite the risks, users often still want to connect their peripheral devices to computing systems. A user may wish to sync her music library, transfer files, and/or upload photos from one device to another. In many cases, the user may only wish to charge the peripheral device from the computing system and may not wish to use any of the peripheral device's other functions.

Traditional systems for protecting computing systems from peripheral devices may rely on all-or-nothing policies that cannot selectively disable or enable any particular function of a device. Some traditional systems may merely ask members of an organization to refrain from connecting their peripheral devices to computing systems without enforcing that request as a requirement. Accordingly, the instant disclosure identifies and addresses a need for additional and improved systems and methods for protecting computing systems from peripheral devices.

SUMMARY

As will be described in greater detail below, the instant disclosure generally relates to systems and methods for protecting computing systems from peripheral devices by, for example, configuring endpoint protection applications with rules that allow peripheral devices to draw charge from computing systems without allowing other functions of the peripheral devices. In one example, a computer-implemented method for protecting computing systems from peripheral devices may include (1) identifying a peripheral device configured to perform a charging function and a non-charging function, (2) configuring an endpoint protection application with an endpoint protection rule that allows the charging function of the peripheral device and does not allow the non-charging function of the peripheral device, (3) detecting that the peripheral device is connected to a computing system that is provisioned with the endpoint protection application, and (4) applying the endpoint protection rule on the computing system to allow the charging function of the peripheral device so that the peripheral device is able to charge via the computing system and block the non-charging function of the peripheral device from being performed on the computing system.

In one embodiment, applying the endpoint protection rule on the computing system to block the non-charging function of the peripheral device may include applying the endpoint protection rule to block all non-charging functions of the peripheral device. In some embodiments, a non-charging function of the peripheral device may include a data transfer function.

In some examples, detecting that the peripheral device is connected to the computing system may include detecting that the peripheral device is connected to the computing system via a universal serial bus (USB). Additionally or alternatively, detecting that the peripheral device is connected to the computing system may include detecting that the peripheral device is connected to the computing system via a wireless network.

In some examples, detecting that the peripheral device is connected to the computing system may include determining a type of the peripheral device and applying the endpoint protection rule may include applying the endpoint protection rule based on the type of the peripheral device. Additionally or alternatively, configuring the endpoint protection application with the endpoint protection rule may include configuring the endpoint protection rule to apply to the type of the peripheral device. In some embodiments, the peripheral device may include a mobile phone, a tablet, and/or an e-reader.

In one embodiment, a system for implementing the above-described method may include (1) an identification module, stored in memory, that identifies a peripheral device configured to perform a charging function and a non-charging function, (2) a configuration module, stored in memory, that configures an endpoint protection application with an endpoint protection rule that allows the charging function of the peripheral device and does not allow the non-charging function of the peripheral device, (3) a detection module, stored in memory, that detects that the peripheral device is connected to a computing system that is provisioned with the endpoint protection application, (4) an application module, stored in memory, that applies the endpoint protection rule on the computing system to allow the charging function of the peripheral device so that the peripheral device is able to charge via the computing system and block the non-charging function of the peripheral device from being performed on the computing system, and (5) at least one physical processor configured to execute the identification module, the configuration module, the detection module, and the application module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a peripheral device configured to perform a charging function and a non-charging function, (2) configure an endpoint protection application with an endpoint protection rule that allows the charging function of the peripheral device and does not allow the non-charging function of the peripheral device, (3) detect that the peripheral device is connected to a computing system that is provisioned with the endpoint protection application, and (4) apply the endpoint protection rule on the computing system to allow the charging function of the peripheral device so that the peripheral device is able to charge via the computing system and block the non-charging function of the peripheral device from being performed on the computing system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
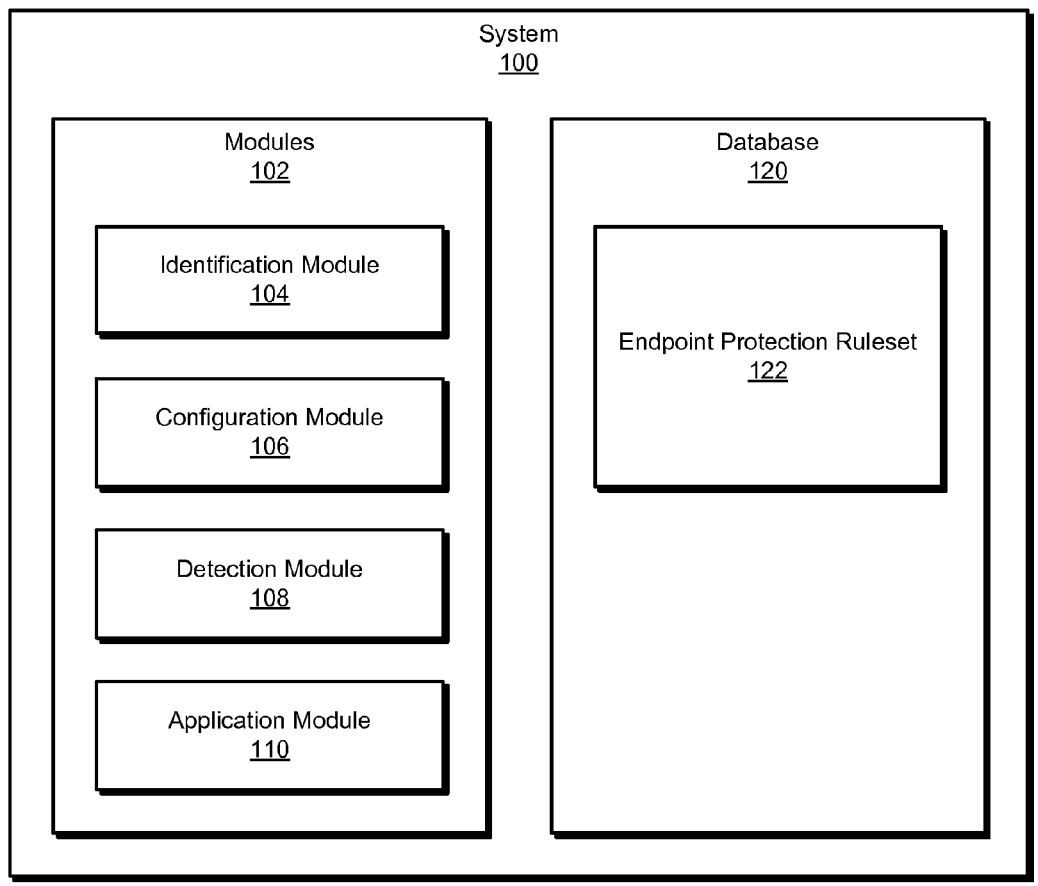
FIG. 1 is a block diagram of an exemplary system for protecting computing systems from peripheral devices.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for protecting computing systems from peripheral devices. As will be explained in greater detail below, by configuring endpoint protection systems to allow peripheral devices to draw charge from computing systems without performing any other functions on the computing systems, the techniques described herein may protect computing systems from peripheral devices without inconveniencing users who desire to charge their peripheral devices. This may be accomplished by creating endpoint protection rules that block non-charging functions of devices with particular class identifiers, such as USB devices.

The following will provide, with reference to FIGS. 1, 2, 4, and 5, detailed descriptions of exemplary systems for protecting computing systems from peripheral devices. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for protecting computing systems from peripheral devices. As illustrated in this figure, exemplary system 100 may include one or more modules 102 for performing one or more tasks. For example, and as will be explained in greater detail below, exemplary system 100 may include an identification module 104 that may identify a peripheral device configured to perform a charging function and a non-charging function. Exemplary system 100 may additionally include a configuration module 106 that may configure an endpoint protection application with an endpoint protection rule that allows the charging function of the peripheral device and does not allow the non-charging function of the peripheral device. Exemplary system 100 may also include a detection module 108 that may detect that the peripheral device is connected to a computing system that is provisioned with the endpoint protection application.

Exemplary system 100 may additionally include an application module 110 that may apply the endpoint protection rule on the computing system to allow the charging function of the peripheral device so that the peripheral device may be able to charge via the computing system and block the non-charging function of the peripheral device from being performed on the computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store endpoint protection ruleset 122. As described further below, endpoint protection ruleset 122 may include various rules for blocking, allowing, and/or modifying various functions of a peripheral device and/or a computing system to which the peripheral device is connected. In some examples, these rules may block, allow, and/or modify various functions in response to any number of trigger events, such as detection of connecting the peripheral device to the computing system.

Database 120 may represent portions of a single database or computing device or a plurality of databases or computing devices. For example, database 120 may represent a portion of server 206 in FIG. 2, computing system 610 in FIG. 6, and/or portions of exemplary network architecture 700 in FIG. 7. Alternatively, database 120 in FIG. 1 may represent one or more physically separate devices capable of being accessed by a computing device, such as server 206 in FIG. 2, computing system 610 in FIG. 6, and/or portions of exemplary network architecture 700 in FIG. 7.

Figure 2:
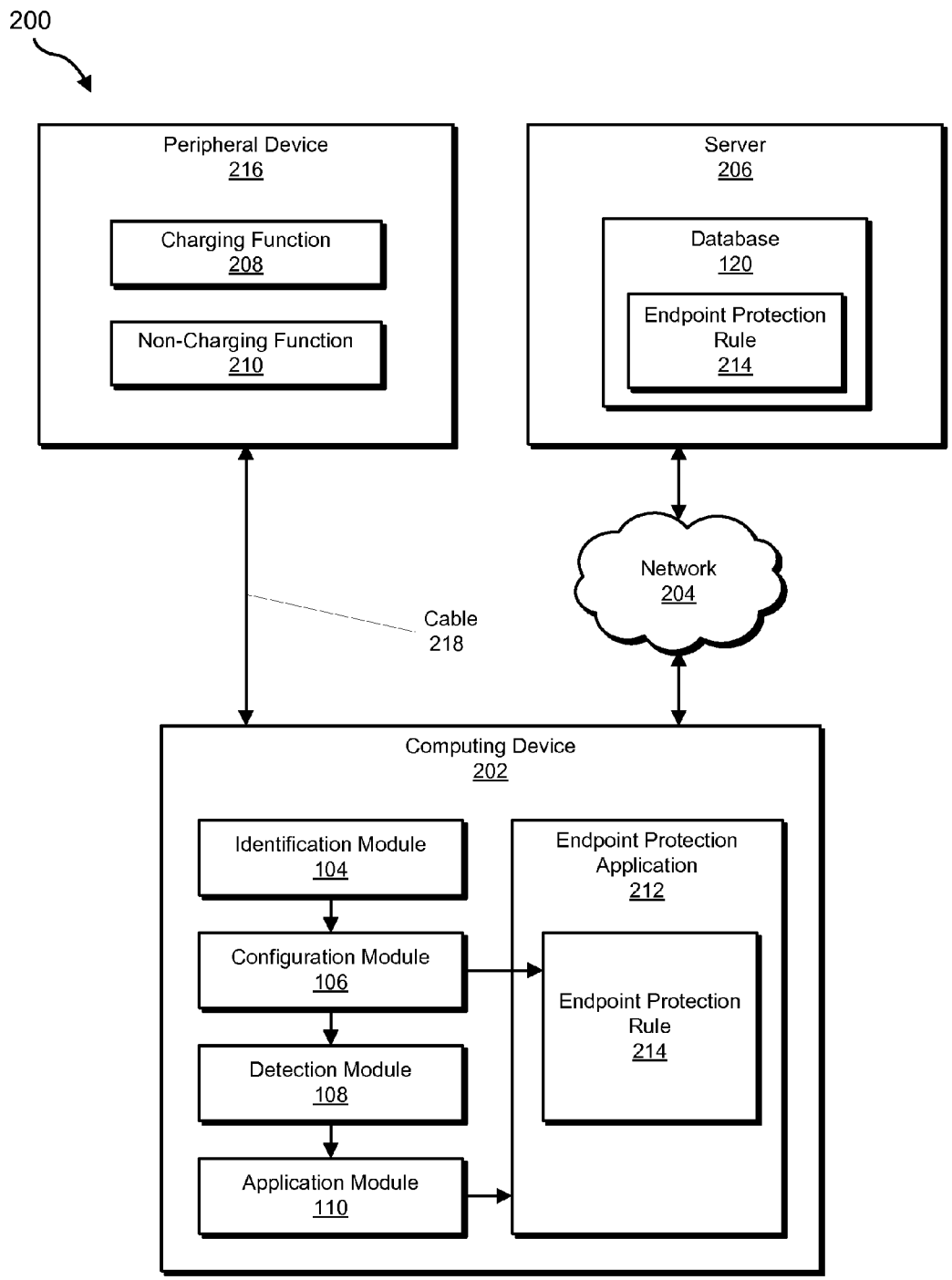
FIG. 2 is a block diagram of an additional exemplary system for protecting computing systems from peripheral devices.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a peripheral device 216. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202, enable computing device 202 to protect computing systems from peripheral devices. For example, and as will be described in greater detail below, one or more of modules 102 may cause computing device 202 to protect computing systems from peripheral devices. For example, identification module 104 may identify a peripheral device 216 configured to perform a charging function 208 and a non-charging function 210. Meanwhile, configuration module 106 may configure an endpoint protection application 212 with an endpoint protection rule 214 that allows charging function 208 of peripheral device 216 and does not allow non-charging function 210 of peripheral device 216. At some point in time, detection module 108 may detect that peripheral device 216 is connected to computing device 202 that is provisioned with endpoint protection application 212. After detection module 108 has detected peripheral device 216, application module 110 may apply endpoint protection rule 214 on computing device 202 to allow charging function 208 of peripheral device 216 so that peripheral device 216 is able to charge via computing device 202 and block non-charging function 210 of peripheral device 216 from being performed on computing device 202.

For example, an administrator may log in to server 206 in order to configure endpoint protection application 212 with endpoint protection rule 214. In this example, endpoint protection application 212 may be installed on computing device 202 as well as other computing devices connected to network 204. The administrator may identify peripheral device 216 that may be of a type commonly used by users of computing devices connected to network 204 and may configure endpoint protection rule 214 to allow charging function 208 and disallow one or more non-charging functions including non-charging function 210. In one example, peripheral device 216 may be a mobile phone and/or non-charging function 210 may be a data transfer function that may potentially be used to transfer sensitive data from computing device 202 in violation of company policy. After the administrator has configured endpoint protection application 212 with endpoint protection rule 214, the administrator may push endpoint protection rule 214 to multiple instances of endpoint protection application 212 on computing systems connected to network 204, including computing device 202. When computing device 202 detects a connection from peripheral device 216 the systems described herein may apply endpoint protection rule 214 to allow charging function 208 and/or disallow non-charging function 210, thus protecting computing device 202 from peripheral device 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Server 206 generally represents any type or form of computing device that is capable of storing endpoint protection rules. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and server 206.

Figure 3:
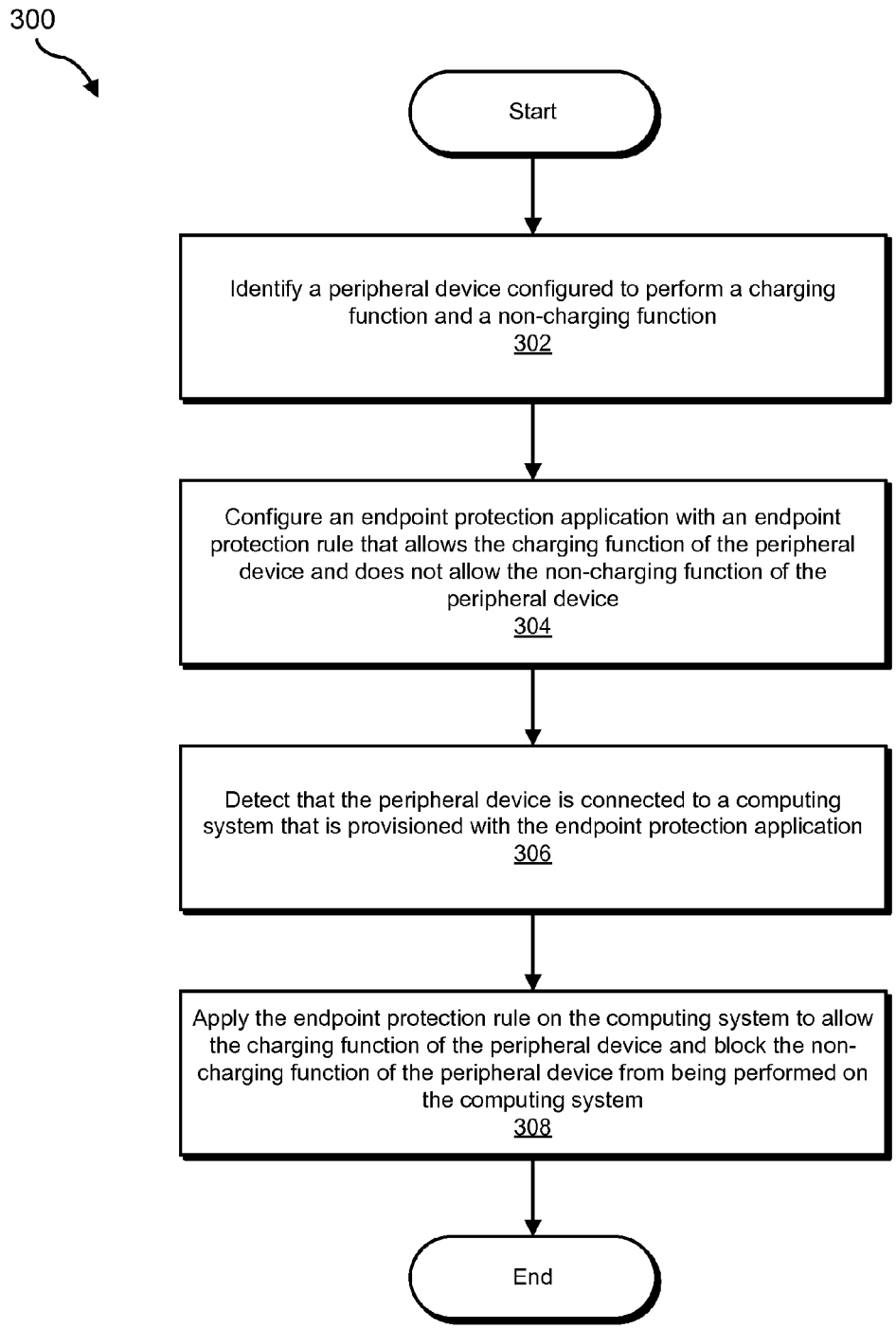
FIG. 3 is a flow diagram of an exemplary method for protecting computing systems from peripheral devices.

FIG. 3 is a flow diagram of an exemplary computer-implemented method 300 for protecting computing systems from peripheral devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a peripheral device configured to perform a charging function and a non-charging function. For example, at step 302 identification module 104 may, as part of computing device 202 in FIG. 2, identify peripheral device 216 configured to perform charging function 208 and non-charging function 210.

The term "peripheral device," as used herein, generally refers to any device or portion of a device which may be connected to a computing system. For example, a peripheral device may include a mobile device. In some examples, a peripheral device may include a mobile phone, a tablet, and/or an e-reader. A peripheral device may also include, without limitation, a portable hard drive, smart keyboard, smart mouse, and/or camera.

The term "charging function," as used herein, generally refers to any function of a device designed to convey current to and/or through the device and/or charge a battery of the device. Moreover, the term "non-charging function," as used herein, generally refers to any function of a device that is not designed to charge the device. In one example, a non-charging function of a device may include a data transfer function. For example, a mobile phone may synchronize address book data with a computing system that is connected to the mobile phone. In another example, a tablet may copy files from a computing system that is connected to the tablet. In some examples, the non-charging function may trigger automatically when the peripheral device is connected to another computing system. For example, malware on a portable storage system may automatically copy itself to any computing system the portable storage system is connected to. Other examples of non-charging functions include, without limitation, taking pictures, sending messages, recording audio and/or video, playing audio and/or video, storing data, retrieving data, and/or changing computing system settings.

Identification module 104 may identify the peripheral device in a variety of ways and/or contexts. For example, identification module 104 may identify the peripheral device as part of an endpoint protection application configured to enforce rules on peripheral devices. In some examples, identification module 104 may identify the peripheral device by identifying a type of the peripheral device, for example, by identifying that the peripheral device includes a mobile phone. In further examples, identification module 104 may identify the peripheral device in cooperation with, or in the same step as, detection module 108, when detection module 108 detects the peripheral connection, as discussed further below. For example, identification module 104 may receive identification information from the peripheral device in response to the peripheral device being connected to computing device 202.

At step 304 one or more of the systems described herein may configure an endpoint protection application with an endpoint protection rule that allows the charging function of the peripheral device and does not allow the non-charging function of the peripheral device. For example, at step 304 configuration module 106 may, as part of computing device 202 in FIG. 2, configure endpoint protection application 212 with endpoint protection rule 214 that allows charging function 208 of peripheral device 216 and does not allow non-charging function 210 of peripheral device 216.

The term "endpoint protection application," as used herein, generally refers to any application designed for the protection of endpoint systems from unauthorized and/or illegitimate use, access, and/or control. Examples of endpoint protection applications and systems may include, without limitation, anti-malware systems, user authentication systems, encryption systems, privacy systems, and/or spam-filtering services. In some examples, an endpoint protection application may include rules that govern the behavior of devices connected to the endpoint system. For example, SYMANTEC ENDPOINT PROTECTION may include a rule management interface that may allow an administrator to create endpoint protection rules that limit allowed activities for peripheral devices connected to an endpoint system.

The term "endpoint protection rule," as used herein, generally refers to any rule created within and/or enforced by an endpoint protection application. In some embodiments, an endpoint protection rule may limit the actions of a device connected to an endpoint system. For example, an endpoint protection rule may prevent a function of a device from acting on an endpoint system. In some examples, endpoint protection rules may apply to individual devices, categories of devices, and/or any device connected to an endpoint system.

Configuration module 106 may configure the endpoint protection application with the endpoint protection rule in a variety of ways and/or contexts. For example, configuration module 106 may configure the endpoint protection application with the endpoint protection rule by presenting an administrator with an interface for configuring rules for the endpoint protection application.

In some examples, configuration module 106 may configure the endpoint protection application with the endpoint protection rule by configuring the endpoint protection rule to apply to a specific type of device, such as the type of the peripheral device. For example, configuration module 106 may configure the endpoint protection rule to apply to peripheral devices that connect via USB ports. In one example, configuration module 106 may configure the endpoint protection rule to apply to USB devices from a specific manufacturer.

Figure 4:
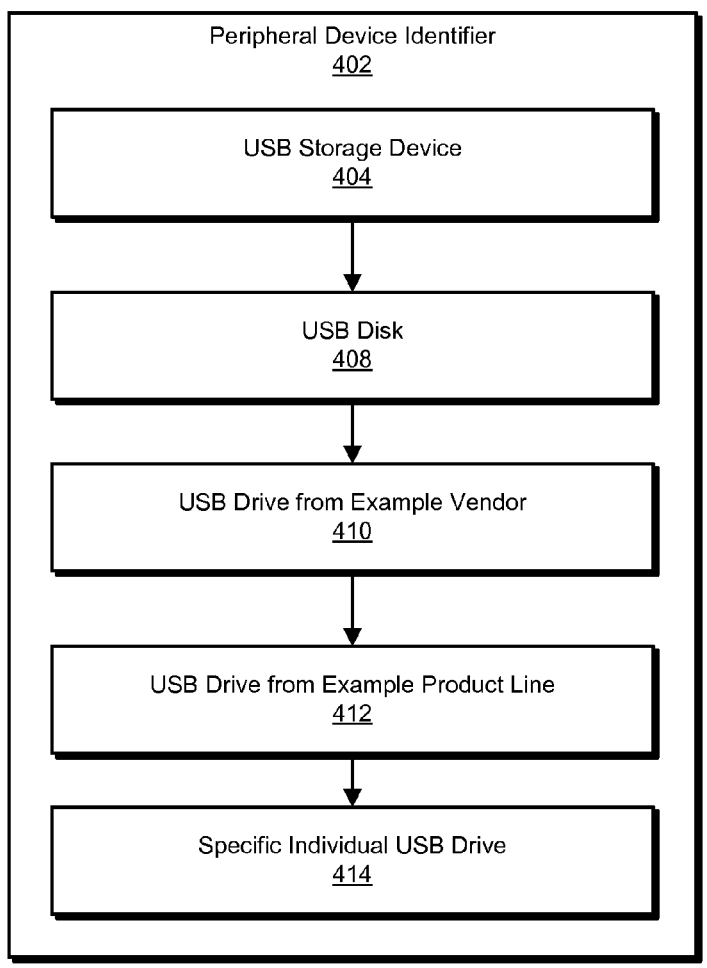
FIG. 4 is a block diagram of an exemplary computing system for protecting computing systems from peripheral devices.

As discussed with respect to FIG. 4, peripheral devices may have many types and/or subtypes which configuration module 106 may use to configure endpoint protection rules. As illustrated in FIG. 4, a peripheral device identifier 402 may be composed of a hierarchy of subtypes. Peripheral device identifier 402 may include an identification as a USB storage device 404, which may be of a type USB disk 408. USB disk 408 may further be identified as a USB drive from an example vendor 410, and more specifically a USB drive from an example product line 412. In some examples, peripheral device identifier 402 may identify a specific individual USB drive 414.

Configuration module 106 may configure an endpoint protection application with rules that apply to any or all of these device types and/or subtypes. For example, configuration module 106 may configure a rule to block non-charging functions of devices identified as USB drive from example product line 412. In this example, devices with the identifier USB drive from example product line 412 may include devices from a product line known to suffer from an unusual amount of malware. In another example, configuration module 106 may configure a rule to block the peripheral device identified as specific individual USB drive 414. In this example, specific individual USB drive 414 may belong to a user known to violate data loss prevention policies by copying sensitive data to peripheral devices.

In some embodiments, the identifier USB storage device 404 may include a class identifier that may identify a generic category of devices that are designated by the operating system. Additionally or alternatively, peripheral device identifier 402 may include a device identifier that includes the class identifier, type, vendor, model revision, and/or serial number of the device. In some examples, configuration module 106 may configure endpoint protection rules based on class identifiers and/or device identifiers.

Returning to FIG. 3, at step 306 one or more of the systems described herein may detect that the peripheral device is connected to a computing system that is provisioned with the endpoint protection application. For example, at step 306 detection module 108 may, as part of computing device 202 in FIG. 2, detect that peripheral device 216 is connected to computing device 202 that is provisioned with endpoint protection application 212.

Detection module 108 may detect the peripheral device in a variety of ways. For example, detection module 108 may be a component of endpoint protection application 212 that may monitor all attempts made by devices to connect to computing device 202. In one example, detection module 108 may be a system monitoring program that may detect when a device is connected via a particular port. For example, detection module 108 may detect any device connected to a computing system's USB port. Additionally or alternatively, detection module 108 may detect any device connected to a computing system via a network.

In some examples, detection module 108 may detect that the peripheral device is connected to the computing system by detecting that the peripheral device is connected to the computing system via USB. For example, detection module 108 may detect that a peripheral device is connected to the computing system's USB port by determining that the peripheral device has a class identifier associated with USB devices.

Additionally or alternatively, detection module 108 may detect that the peripheral device is connected to the computing system by detecting that the peripheral device is connected to the computing system via a wireless network. For example, detection module 108 may detect that a peripheral device has connected to a wireless network that the computing system is also connected to and/or the peripheral device is attempting to communicate with the computing system via the wireless network. In some examples, charging function 208 of the peripheral device may refer to charging the peripheral device wirelessly (e.g., through inductive charging) via computing device 202.

At step 308 one or more of the systems described herein may apply the endpoint protection rule on the computing system to allow the charging function of the peripheral device so that the peripheral device is able to charge via the computing system and block the non-charging function of the peripheral device from being performed on the computing system. For example, at step 308 application module 110 may, as part of computing device 202 in FIG. 2, apply endpoint protection rule 214 on computing device 202 to allow charging function 208 of peripheral device 216 so that peripheral device 216 is able to charge via computing device 202 and block non-charging function 210 of peripheral device 216 from being performed on computing device 202.

Application module 110 may apply the endpoint protection rule in a variety of ways and/or contexts. For example, application module 110 may apply an endpoint protection rule to explicitly allow a charging function of a device and/or disallow any not explicitly allowed functions. In one example, application module 110 may intercept and/or kill any processes launched by a peripheral device. Additionally or alternatively, application module 110 may represent the computing system to the peripheral device as a charging station such a wall outlet rather than as a computing system.

In one embodiment, application module 110 may apply the endpoint protection rule on the computing system to block the non-charging function of the peripheral device by applying the endpoint protection rule to block all non-charging functions of the peripheral device. For example, application module 110 may apply the endpoint protection rule by explicitly allowing charging functions and/or a specific charging function and disallowing any function not explicitly allowed by the rule.

In some examples, detection module 108 may detect that the peripheral device is connected to the computing system by determining a type of the peripheral device and application module 110 may apply the endpoint protection rule by applying the endpoint protection rule based on the type of the peripheral device. For example, detection module 108 may detect that the peripheral device includes a USB storage device and application module 110 may apply the endpoint protection rule that affects USB storage devices.

Figure 5:
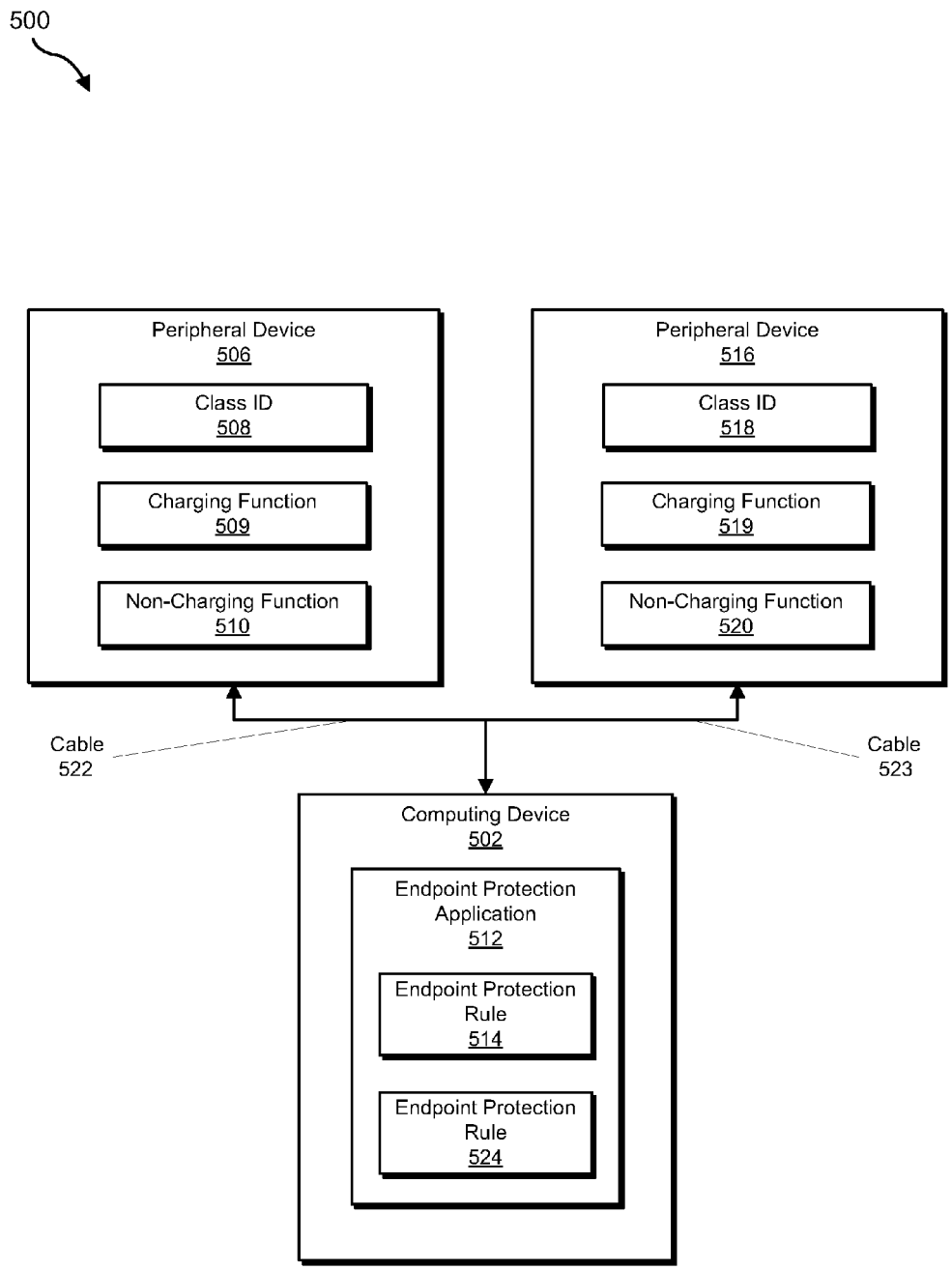
FIG. 5 is a block diagram of an exemplary computing system for protecting computing systems from peripheral devices.

In some examples, application module 110 may apply different endpoint protection rules to different types of peripheral devices. FIG. 5 is a block diagram 500 illustrating techniques for protecting computing systems from peripheral devices of different types. As illustrated in FIG. 5, a computing device 502 may include an endpoint protection application 512, which may be configured with endpoint protection rules 514 and/or 524. Computing device 502 may be connected to a peripheral device 506 via a cable 522 and/or peripheral device 516 via a cable 526. Peripheral device 506 may include a class ID 508, a charging function 509, and/or a non-charging function 510. Similarly, peripheral device 516 may include a class ID 518, a charging function 519, and/or a non-charging function 520. In some examples, endpoint protection rule 514 may apply to devices with class ID 508 and/or endpoint protection rule 524 may apply to devices with class ID 518. In this example, endpoint protection application 512 may apply endpoint protection rule 514 to allow charging function 509 of peripheral device 506 through computing device 502 and/or block non-charging function 510 from affecting computing device 502. Endpoint protection application 512 may additionally apply endpoint protection rule 524 to allow charging function 519 of peripheral device 516 through computing device 502 and/or block non-charging function 520 from affecting computing device 502.

As explained above in connection with method 300 in FIG. 3, by configuring endpoint protection systems to allow peripheral devices to draw charge from computing systems without performing any other functions on the computing systems, the techniques described herein may protect computing systems from peripheral devices without inconveniencing users who desire to charge their peripheral devices. This may be accomplished by creating endpoint protection rules that block non-charging functions of devices with particular class identifiers, such as USB devices.

Figure 6:
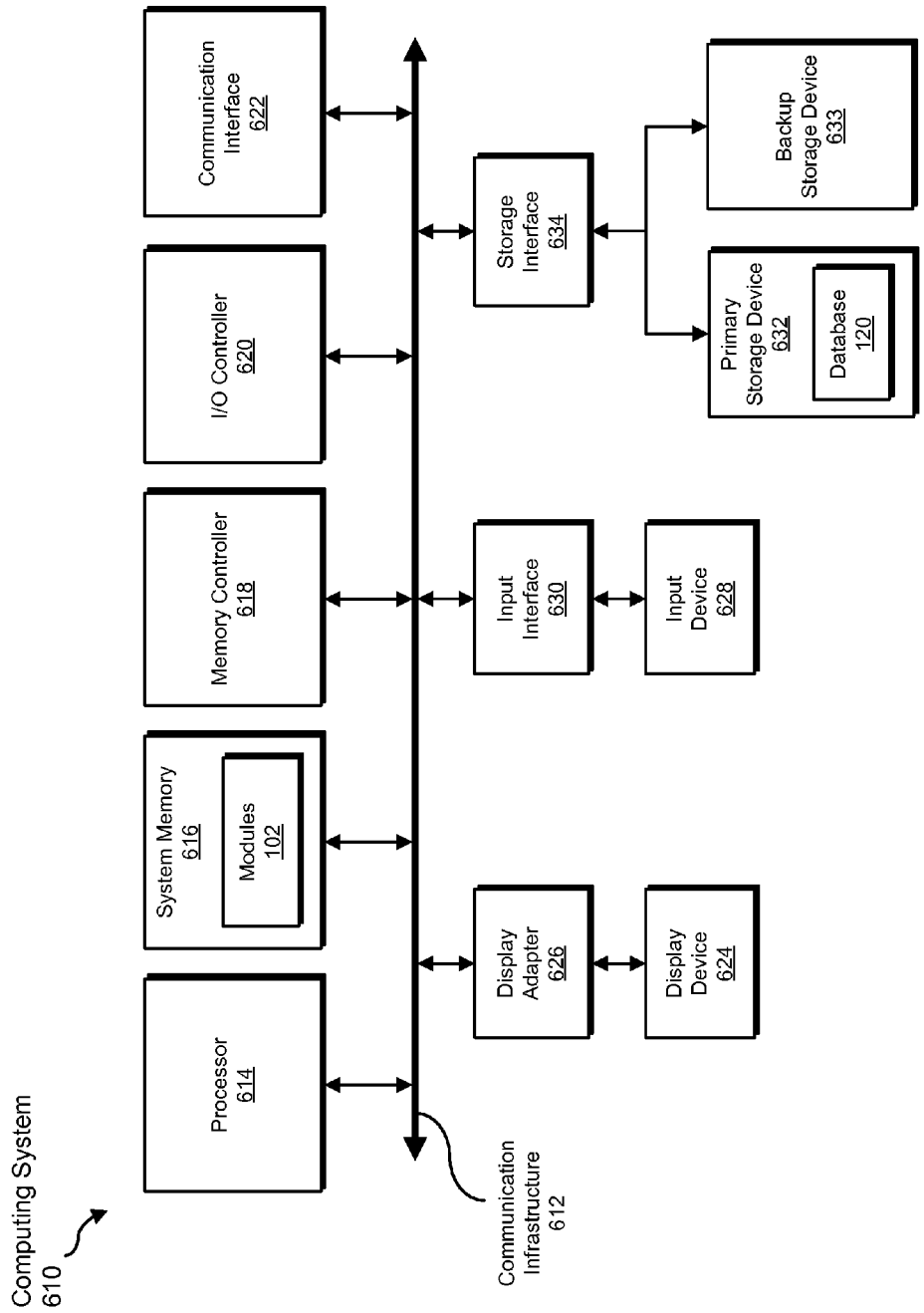
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, USB host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
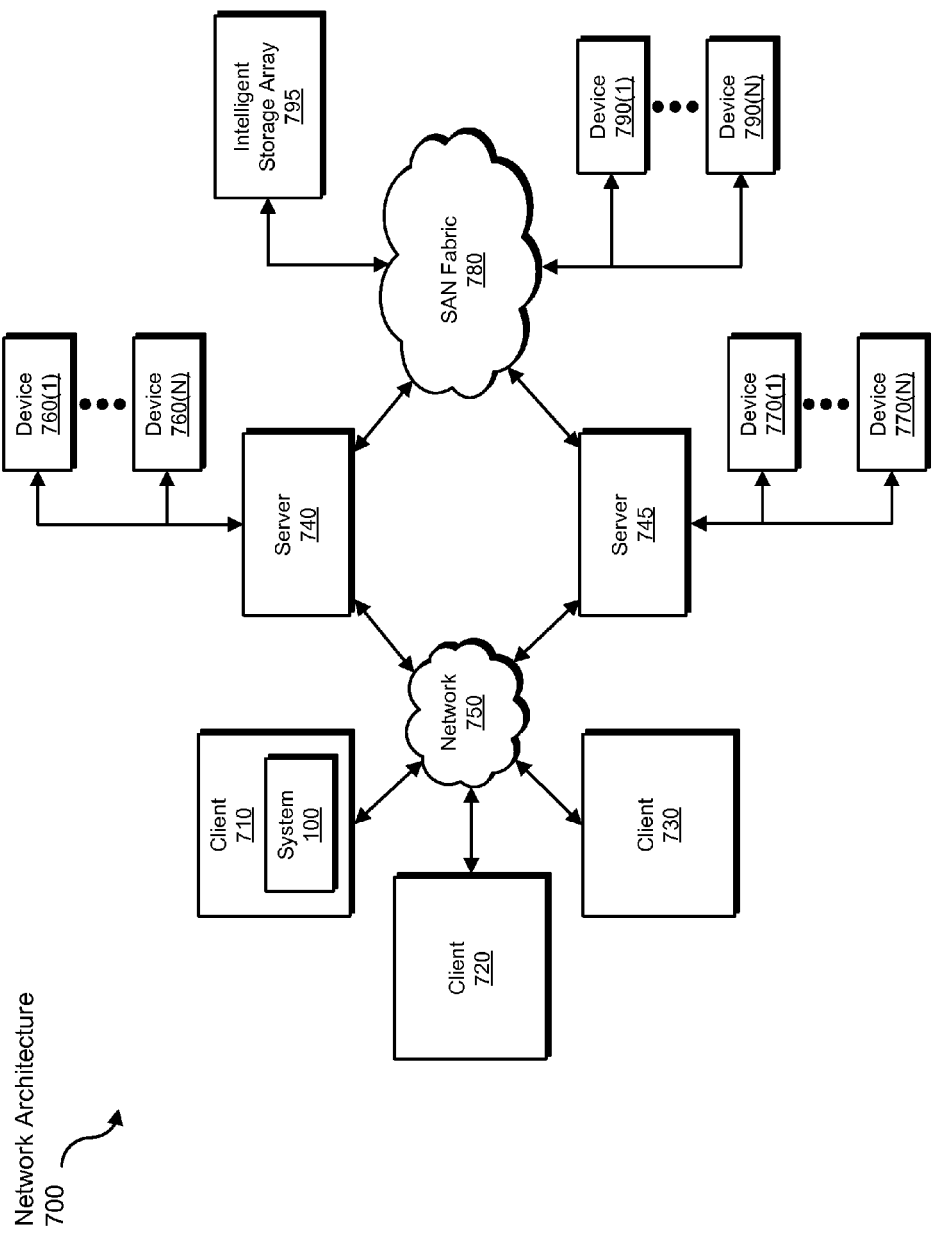
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for protecting computing systems from peripheral devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive device data to be transformed, transform the device data, output a result of the transformation to an endpoint protection application, use the result of the transformation to apply an endpoint protection rule, and store the result of the transformation to a database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for protecting computing systems from peripheral devices, at least a portion of the method being performed by a computing device comprising at least one processor, the method comprising:
   identifying a peripheral device configured to perform a charging function and at least one non-charging function;
   wherein the charging function is any functions of the peripheral device that conveys current to and through the peripheral device and/or charges a battery of the peripheral device and the non-charging function is any functions of the peripheral device that is not designed to charging the peripheral device;
configuring an endpoint protection application with an endpoint protection rule that allows the charging function of the peripheral device and does not allow the non-charging function of the peripheral device;
wherein configuring the endpoint protection application with the endpoint protection rule comprises configuring the endpoint protection rule to apply to a device type of the peripheral device;
detecting, at least in part by determining a type of universal serial bus device that the peripheral device comprises, based on a universal serial bus class identifier of the peripheral device, that the peripheral device is connected to a computing system that is provisioned with the endpoint protection application; and
applying, based at least in part on the type of universal serial bus device that the peripheral device comprises, the endpoint protection rule on the computing system to allow the charging function of the peripheral device;
wherein the peripheral device is able to charge via the computing system, while the non-charging function of the peripheral device is blocked from being performed on the computing system by representing the computing system to the peripheral device as a wall outlet on which the non-charging function cannot be performed rather than as the computing system on which the non-charging function can be performed.

2. The computer-implemented method of claim 1, wherein applying the endpoint protection rule on the computing system to block the non-charging function of the peripheral device comprises applying the endpoint protection rule to block all non-charging functions of the peripheral device from being performed on the computing system.

3. The computer-implemented method of claim 1, wherein detecting that the peripheral device is connected to the computing system comprises detecting that the peripheral device is connected to the computing system via a universal serial bus.

4. The computer-implemented method of claim 1, wherein detecting that the peripheral device is connected to the computing system comprises detecting that the peripheral device is connected to the computing system via a wireless network.

5. The computer-implemented method of claim 1, wherein the peripheral device comprises at least one of:
a mobile phone;
a tablet; and
an e-reader.

6. The computer-implemented method of claim 1, wherein the non-charging function of the peripheral device comprises a data transfer function.

7. The computer-implemented method of claim 1, wherein the universal serial bus class identifier of the peripheral device identifies a generic category of devices that is designated by an operating system of the computing device.

8. A system for protecting computing systems from peripheral devices, the system comprising:
a memory;
an identification module, stored in the memory, that identifies a peripheral device configured to perform a charging function and at least one non-charging function;
wherein the charging function is any functions of the peripheral device that conveys current to and through the peripheral device and/or charges a battery of the peripheral device and the non-charging function is any functions of the peripheral device that is not designed to charging the peripheral device;
a configuration module, stored in the memory, that configures an endpoint protection application with an endpoint protection rule that allows the charging function of the peripheral device and does not allow the non-charging function of the peripheral device;
wherein the configuration module configures the endpoint protection application with the endpoint protection rule comprises configuring the endpoint protection rule to apply to a device type of the peripheral device;
a detection module, stored in the memory, that detects, at least in part by determining a type of universal serial bus device that the peripheral device comprises, based on a universal serial bus class identifier of the peripheral device, that the peripheral device is connected to a computing system that is provisioned with the endpoint protection application;
an application module, stored in the memory, that applies, based at least in part on the type of universal serial bus device that the peripheral device comprises, the endpoint protection rule on the computing system to allow the Charging function of the peripheral device;
wherein the peripheral device is able to charge via the computing system, while the non-charging function of the peripheral device is blocked from being performed on the computing system by representing the computing system to the peripheral device as a wall outlet on which the non-charging function cannot be performed rather than as the computing system on which the non-charging function can be performed; and
at least one hardware processor configured to execute the identification module, the configuration module, the detection module, and the application module.

9. The system of claim 8, wherein the application module applies the endpoint protection rule on the computing system to block the non-charging function of the peripheral device by applying the endpoint protection rule to block all non-charging functions of the peripheral device from being performed on the computing system.

10. The system of claim 8, wherein the detection module detects that the peripheral device is connected to the computing system by detecting that the peripheral device is connected to the computing system via a universal serial bus.

11. The system of claim 8, wherein the detection module detects that the peripheral device is connected to the computing system by detecting that the peripheral device is connected to the computing system via a wireless network.

12. The system of claim 8, wherein the peripheral device comprises at least one of:
a mobile phone;
a tablet; and
an e-reader.

13. The system of claim 8, wherein the non-charging function of the peripheral device comprises a data transfer function.

14. The system of claim 8, wherein the detection module determines the type of universal serial bus device of the peripheral device using a device identifier of the peripheral device that comprises at least one of:
an identifier of a vendor of the peripheral device;
an identifier of a version of the peripheral device; and
a serial number of the peripheral device.

15. A non-transitory computer-readable medium comprising one or more computer-readable instructions that, when executed by at least one processor of a computing device, cause the computing device to:
- identify a peripheral device configured to perform a charging function and at least one non-charging function;
- wherein the charging function is any functions of the peripheral device that conveys current to and through the peripheral device and/or charges a battery of the peripheral device and the non-charging function is any functions of the peripheral device that is not designed to charging the peripheral device;
- configure an endpoint protection application with an endpoint protection rule that allows the charging function of the peripheral device and does not allow the non-charging function of the peripheral device;
- wherein configuring the endpoint protection application with the endpoint protection rule comprises configuring the endpoint protection rule to apply to a device type of the peripheral device;
- detect, at least in part by determining a type of universal serial bus device that the peripheral device comprises, based on a universal serial bus class identifier of the peripheral device, that the peripheral device is connected to a computing system that is provisioned with the endpoint protection application; and
- apply, based at least in part on the type of universal serial bus device that the peripheral device comprises, the endpoint protection rule on the computing system to allow the charging function of the peripheral device;
- wherein the peripheral device is able to charge via the computing system, while the non-charging function of the peripheral device is blocked from being performed on the computing system by representing the computing system to the peripheral device as a wall outlet on which the non-charging function cannot be performed rather than as the computing system on which the non-charging function can be performed.

16. The non-transitory computer-readable medium of claim 15, wherein the one or more computer-readable instructions cause the computing device to apply the endpoint protection rule on the computing system to block the non-charging function of the peripheral device by applying the endpoint protection rule to block all non-charging functions of the peripheral device from being performed on the computing system.

17. The non-transitory computer-readable medium of claim 15, wherein the one or more computer-readable instructions cause the computing device to detect that the peripheral device is connected to the computing system by detecting that the peripheral device is connected to the computing system via a universal serial bus.

18. The non-transitory computer-readable medium of claim 15, wherein the one or more computer-readable instructions cause the computing device to detect that the peripheral device is connected to the computing system by detecting that the peripheral device is connected to the computing system via a wireless network.

* * * * *